(12) United States Patent
Belousov et al.

(10) Patent No.: US 7,570,368 B2
(45) Date of Patent: Aug. 4, 2009

(54) METHOD AND APPARATUS FOR MEASURING THE CURVATURE OF REFLECTIVE SURFACES

(75) Inventors: Mikhail Belousov, Plainsboro, NJ (US); Boris Volf, Hightstown, NJ (US)

(73) Assignee: Veeco Instruments Inc., Plainview, NY (US)

( * ) Notice: Subject to any disclaimer, the term of this patent is extended or adjusted under 35 U.S.C. 154(b) by 256 days.

(21) Appl. No.: 11/127,834

(22) Filed: May 12, 2005

(65) Prior Publication Data

US 2005/0286058 A1     Dec. 29, 2005

Related U.S. Application Data

(60) Provisional application No. 60/570,332, filed on May 12, 2004.

(51) Int. Cl.
*G01B 11/24* (2006.01)
(52) U.S. Cl. ..................................... 356/601
(58) Field of Classification Search ......... 356/601–623, 356/124–127
See application file for complete search history.

(56) References Cited

U.S. PATENT DOCUMENTS

| | | | |
|---|---|---|---|
| 4,735,508 A | 4/1988 | Bellio | |
| 4,900,940 A | 2/1990 | Nakamura | |
| 4,982,078 A * | 1/1991 | Ekstrand | 250/206.1 |
| 5,059,022 A * | 10/1991 | Ookawa | 356/124 |
| 5,067,817 A | 11/1991 | Glenn | |
| 5,118,955 A | 6/1992 | Cheng | |
| 5,233,201 A * | 8/1993 | Cheng | 250/559.23 |
| 5,633,718 A | 5/1997 | Manning | |
| 5,760,889 A * | 6/1998 | Manning | 356/124 |
| 6,075,604 A * | 6/2000 | Crawforth et al. | 356/600 |
| 6,108,170 A * | 8/2000 | Crawforth et al. | 360/234.3 |
| 6,721,056 B1 * | 4/2004 | Nakauchi et al. | 356/489 |
| 7,196,801 B1 * | 3/2007 | Janik et al. | 356/606 |
| 7,391,523 B1 * | 6/2008 | Taylor et al. | 356/612 |

OTHER PUBLICATIONS

Beresford, R., J. Yin, K. Tetz, and E. Chason, "Real-time measurements of stress relaxation in InGaAs/GaAs," J. Vac. Sci. Technol. B 18(3), May/Jun. 2000, pp. 1431-1434.

Hearne, S., E. Chason, J. Han, J.A. Floro, J. Figiel, and J. Hunter, "Stress evolution during matalorganic chemical vapor deposition of GaN," Appl. Physics Letters 74(3), Jan. 18, 1999, pp. 356-358.

(Continued)

*Primary Examiner*—Hoa Q Pham
(74) *Attorney, Agent, or Firm*—Lerner, David, Littenberg, Krumholz & Mentlik, LLP (57) ABSTRACT

A method for monitoring the curvature of a surface of a body such as a semiconductor wafer (22) includes directing a beam of light along an impingement axis (36) onto the surface so that a beam of light (41) is reflected from the surface at a point of impingement. The position of the reflected beam (41) is detected in two dimensions (x,y). The body (22) is moved relative to the impingement axis (41) in a direction transverse to the impingement axis and the beam-directing and position determining steps are repeated. The curvature of the surface is calculated from the detected positions of the reflected beam in a plurality of repetitions.

33 Claims, 2 Drawing Sheets

OTHER PUBLICATIONS

Floro, J.A., E. Chason, S.R. Lee, R.D. Twesten, and R.Q. Hwang, "Real-Time Stress Evolution During Si1-xGex Heteroepitaxy: Dislocations, Islanding, and Segregation," J. Elec. Materials 26(9), Sep. 1997, pp. 969-979.

Chason, E. and J.A. Floro, "Measurements Of Stress Evolution During Thin Film Deposition," Mat. Res. Soc. Symp. Proc., vol. 428, Apr. 8-12, 1996, San Francisco, CA, pp. 499-504.

Hoffman, JR., R.W., Belousov, M., Volf, B., Murphy, M., Cruel, J., Lee, D., Guary, A., and Armour, E.A., "In-Situ Strain Measurement During Epitaxy of INP Based Materials", 15th IPRM, May 12, 2003.

Hoffman, JR., R.W., Murphy, M., Cruel, J., Belousov, M., Volf, B., Murray, C., and Armour, E.A., "In situ strain control during MOCVD growth of high-quality InP-based long wavelength distributed Bragg reflectors", Journal of Crystal Growth 261 (2004), pp. 301-308.

\* cited by examiner

FIG. 1

METHOD AND APPARATUS FOR MEASURING THE CURVATURE OF REFLECTIVE SURFACES

CROSS-REFERENCE TO RELATED APPLICATIONS

The present application claims the benefit of the filing date of U.S. Provisional Patent Application No. 60/570,332 filed May 12, 2004 the disclosure of which is hereby incorporated by reference herein.

BACKGROUND OF THE INVENTION

The present invention relates to methods and apparatus for measuring the curvature of reflective surfaces such as the surfaces of semiconductor wafers.

Semiconductors are commonly formed by epitaxial growth. In an epitaxial growth process, materials which form a layer, such as a semiconductor layer, are deposited onto the surface of a substrate, typically a crystalline substrate, so that the deposited material forms a generally crystalline structure having a crystal lattice similar to that of the substrate. The spacing between atoms within a crystal lattice (referred to as the "lattice spacing") depends upon the composition of the crystal. Where the deposited layer has a composition different from the composition of the substrate, the deposited layer may have a nominal lattice spacing, different from the lattice spacing of the substrate. In this case, the deposited crystalline layer forms with its lattice spacing stretched or compressed to conform to the lattice spacing of the substrate. Stated another way, the deposited layer is formed in a strained condition.

This causes the wafer to deform into a dome-like shape. Thus, the surface of the wafer which is originally flat takes the form of a segment of a sphere. For a wafer and layer having a given set of physical properties, there is a known relationship between the degree of curvature and the strain in the deposited layer. It has been proposed heretofore to measure the curvature of a wafer during deposition of a layer thereon so that the strain in the deposited layer can be monitored during the deposition process. See, e.g., Chason et al., "Measurements Of Stress Evolution During Thin Film Deposition," Materials Research Society Symposium Proceedings Vol. 428 pp. 499-504 (1996). However, the systems proposed heretofore have not been well suited to monitoring strain during wafer growth under typical production conditions. For example, many compound semiconductors, such as III-V semiconductors, are grown using metal organic chemical vapor deposition ("MOCVD"). In some MOCVD processes, numerous wafers are disposed on a carrier which is movably mounted within a deposition chamber. While the carrier and chamber are maintained at an elevated temperature, gases suitable for forming the desired layer are admitted to the chamber. The carrier is moved rapidly within the chamber to promote even distribution of the gases on the surfaces of the numerous wafers and uniform reaction conditions. Merely by way of example, an MOCVD reactor of the type sold under the trademark TurboDisk® by the TurboDisk Division of Veeco Instruments Inc. incorporates a disk-like carrier which rotates at speeds on the order of 1,000 revolutions per minute, so that the wafers move with considerable speed around the axis of rotation of the carrier.

In the apparatus taught in the aforementioned Chason et al. article, a laser beam is subdivided into several parallel beams which are directed onto a surface and reflected back from the surface to a detector. The relative spacing between the beams can be monitored to provide data from which the wafer curvature can be calculated. This apparatus is relatively delicate and expensive, and is typically incapable of measuring the curvature of a fast-moving wafer. Devices of this type also require a large diameter view port, which further limits their use with industrial MOCVD reactors. Cheng, U.S. Pat. No. 5,233,201 and Cheng, U.S. Pat. No. 5,118,955 ("Cheng '201" and Cheng '955" respectively) disclose variants of a relatively simple, single-beam system. A single beam is swept across the surface of a wafer and reflected back to a detector. However, instruments of this type require precise placement and movement of the wafer, and are not well suited for measure wafer curvature in a production environment.

Thus, despite considerable efforts in the art heretofore, there are substantial needs for improved methods and apparatus for monitoring wafer curvature.

SUMMARY OF INVENTION

One aspect of the invention provides methods of monitoring the curvature of a surface of a body, as, for example, a surface of a semiconductor wafer. A method according to this aspect of the invention desirably includes the step of directing a beam of light along an impingement axis onto the surface of the body so that a beam of light is reflected from the surface at a point of impingement. The method desirably further includes detecting the position of the reflected beam in two dimensions. The method additionally includes the steps of moving the body relative to the impingement axis in a direction transverse to the impingement axis and repeating the aforesaid beam-directing and detecting steps. Thus, in each repetition the beam will be directed onto a new point of impingement. The method most preferably includes the further step of calculating the curvature of the surface from the detected positions of the reflected beam in a plurality of repetitions.

In a particularly preferred embodiment, the body is a semiconductor wafer, and the step of moving the body is performed by rotating a carrier about an axis of revolution. The carrier preferably bears the semiconductor wafer with a major surface of the wafer extending generally transverse to the axis of revolution, and the beam impinges on this major surface.

A further aspect of the invention provides apparatus which can be used to monitor the curvature of a wafer. The apparatus desirably includes a frame and a carrier rotatable relative to said frame about an axis of revolution, the carrier having a wafer-bearing region adapted to hold at least one semiconductor wafer with a major surface of the wafer extending generally transverse to the axis of revolution. A drive motor may be connected to the carrier for rotating the carrier.

The apparatus desirably further includes a light source mounted to the frame so that an incident beam of light from said light source will pass along an impingement axis remote from the axis of revolution, such axis extending through wafer-bearing region of the carrier. Thus, the incident beam will impinge on the major surface of a wafer carried by said carrier at a series of impingement points and beams will be reflected from such impingement points. The apparatus desirably also includes a sensor mounted to the frame so that said sensor will intercept the reflected beams. The sensor most preferably is arranged to provide signals representing the position of the reflected beams in two dimensions transverse to said impingement axis.

As discussed further below, the apparatus may be integrated with semiconductor processing apparatus, and can be used to measure curvature of wafers during treatment.

DETAILED DESCRIPTION

A system according to one embodiment of the present invention incorporates a structure having a chamber 10 and a disk-like carrier 12 mounted within chamber 10 on a shaft 14, so that the carrier 12 can be rotated about an axis of revolution 16, nominally perpendicular to the surface of the carrier. Chamber 10 has one or more optically transparent windows as, for example, a window 11 in the top wall of the chamber, above the carrier. The size of window 11 relative to chamber 10 is greatly exaggerated in FIG. 1 for clarity of illustration. A motor drive 18 is connected to shaft 14 for rotating the carrier. Carrier 12 has a front or top surface 20 with shallow pockets 22 formed therein. Each pocket is adapted to hold a disk-like wafer 24 so that a nominally planar major surface of the wafer faces upwardly (toward the top of the drawing in FIG. 1), and so that wafer is remote from the axis of revolution 16. A heater 26 is mounted within the chamber for maintaining the carrier at an elevated temperature.

Figure 1:
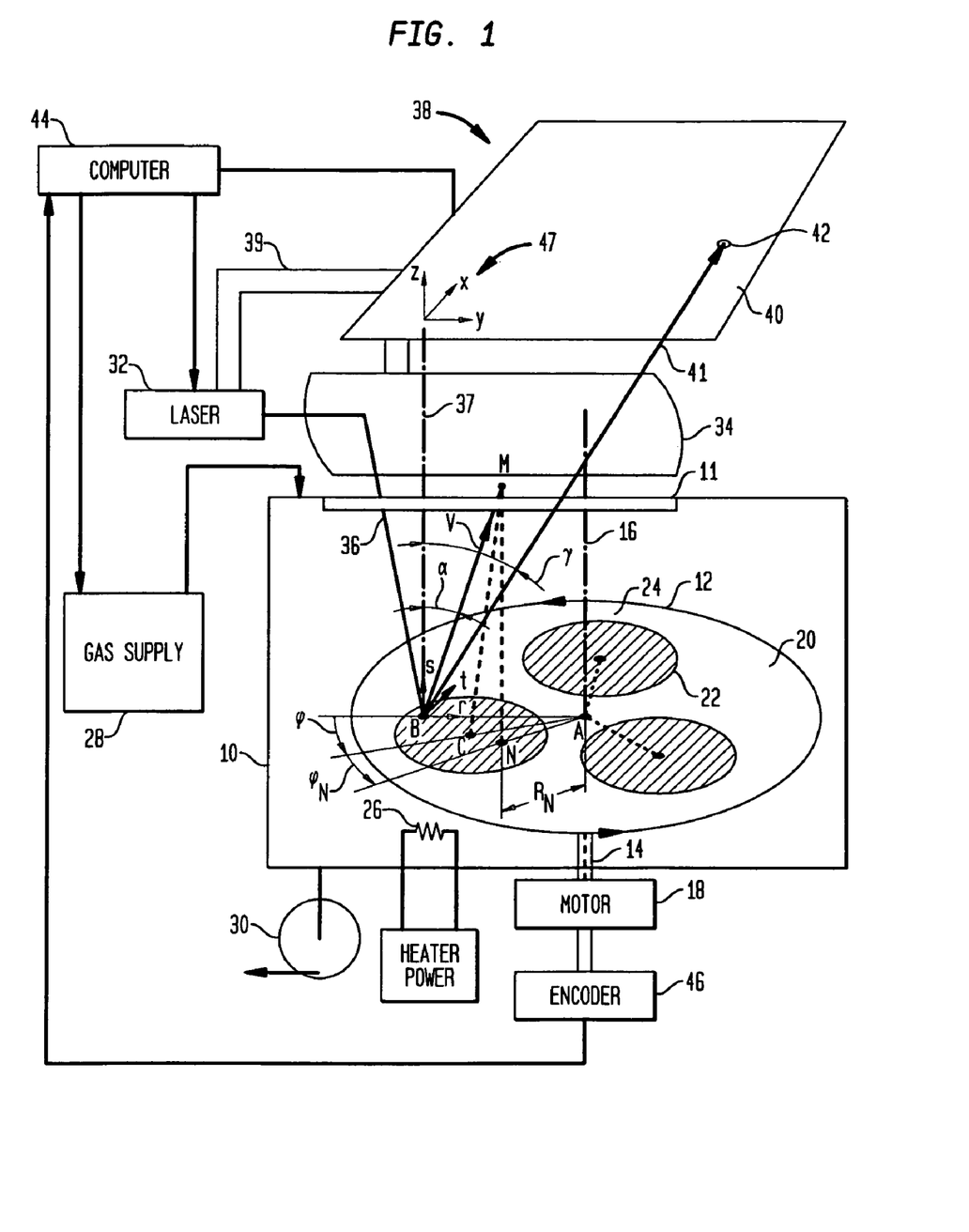
FIG. 1 is a schematic view of apparatus according to one embodiment of the invention.

The apparatus further includes a gas supply 28. The gas supply incorporates components such as gas containers, vials and piping for supplying a specified gas mixture to the interior of chamber 10. Preferably, the gas supply apparatus is controllable so as to vary the composition of the supplied gas. A vacuum pump 30 is also connected to the interior of chamber 10 for maintaining the interior of the chamber at a specified pressure. The foregoing features of the apparatus may be conventional. For example, the chamber 10, and the associated features discussed above, may be an epitaxial growth reactor of the type sold under the trademark TurboDisk®.

The apparatus further includes a beam emitter such as a laser 32 equipped with appropriate focusing lenses (not shown) or a lamp with a collimator (not shown). The light source further includes a beam splitter 34. Beam splitter 34 is mounted to the structure of chamber 10 in alignment with window 11, so that a beam emitted by emitter 32 will be directed downwardly through window 11 into the interior of the chamber along an impingement axis 36, extending generally vertically. Impingement axis 36 lies at a predetermined, fixed distance from axis of rotation 16. This distance is selected so that the impingement axis and hence the beam 36, directed there along the impingement axis, will intercept the region of carrier 12 having pockets 22.

The apparatus further includes a two-dimensional beam sensor 38. Sensor 38 may be a two-dimensional position sensitive detector (PSD). As referred to herein, a position sensitive detector is an analog semiconductor device such as a photodiode having a sensing surface and plural electrodes arranged at various positions so that the electrical outputs from the various electrodes vary with the position of light impinging on the surface. For example, suitable two-dimensional position sensitive detectors are commercially available from Hamamatsu Photonics, K.K., of Hamamatsu City, Japan. These detectors are photodiodes having four anode electrodes and one common cathode. When a spot of light is applied to the sensing surface, the currents appearing at the various anode electrodes vary with illumination intensity in the spot and with position of the spot in two dimensions along the surface. Well-known circuits are available for converting the current values into intensity and Cartesian coordinates of the spot position. Position sensitive detectors are preferred as they can track spot positions over a broad range and can provide position measurements rapidly. However, other sensors, such as photodetector arrays and video cameras commonly of the types used in imaging can be employed.

Sensor 38 defines a plane 40 oriented horizontally, and hence perpendicular, to the axis of rotation 16. The sensor is arranged to detect a beam 41 intercepting plane 40 and to generate signals representing the point of intersection between the beam and the plane in two dimensions, denoted "X" and "Y" along the plane. These signals may include digital or analog representations of the values of the location of the intercept point 42 in the X direction and in the Y direction. Both of these dimensions are transverse to the direction of impingement axis 36 and transverse to rotation axis 16. In the particular embodiment illustrated, the Y direction is selected so that it extends radially with respect to axis 16. The origin 47 of the X-Y coordinate system is selected so that it lies at the intercept point of a beam reflected by a perfectly planar surface lying exactly perpendicular to axis of rotation 16. In the special case where the direction of incident beam 36 is exactly vertical and hence exactly parallel to the axis of rotation 16, origin 36 lies exactly above the incident beam axis.

Sensor 38 also provides data representing the intensity of light impinging on the sensor at intercept point 42. Inasmuch as laser 32 provides a stable output, and hence a stable intensity in the incident beam 36, the intensity of the reflected beam which impinges on the sensor is directly related to the reflectivity of the surface which reflects beam 36 onto the sensor.

Desirably, laser 32, beam splitter 34 and sensor 38 are mounted together on a sub-frame or "optical head" 39, so that these components remain in fixed position relative to one another. The sub-frame 39, in turn, may be mounted to chamber 10 in alignment with window 11.

The apparatus further includes a computer 44 which may be a general-purpose digital computer having the normal components of such a device, including a central processing unit, memory and input/output devices, as well as a bus linking these elements. Sensor 38 is connected to computer 44 so that data captured by the sensor will be accepted by the computer. The interface between the sensor and the computer may use conventional interfacing techniques. For example, where the sensor provides analog data, the interface typically will include a digitizer. Where the sensor includes a position sensitive detector as discussed above, the interface will include conventional circuitry for converting the currents at the various electrodes to signals representing beam spot position in the X and Y directions, as well as beam spot intensity. Although computer 44 is depicted as a single unit, the functions performed by computer 44 as described below may be performed by a distributed computer system including a plurality of separate computers communicating with one another. Computer 44 may be arranged to control the gas supply 28 so as to vary the composition of the reactant gases supplied to chamber 10. The computer 44 may also be arranged to control other elements of the apparatus such as vacuum pump 30 and heater 26, as well as motor 18.

The apparatus is equipped with a structure which provides data to computer 44, representing the rotational position of carrier 12. As seen in FIG. 1, this apparatus may include a conventional rotary shaft encoder 46, mechanically linked to shaft 14 and hence to the carrier. Alternatively, the computer 44 may be arranged to deduce rotational position from the reflectivity data derived by sensor 38. As further discussed below, rotation of the carrier will bring successive wafers 24 into the path of incident beam 36 and will also bring regions of carrier surface 20 into the path of beam 36. Because the reflectivity of wafers 24 differs from the reflectivity of carrier surface 20, computer 44 can detect abrupt transitions in reflectivity and thus count the number of wafers 24, and hence the number of pockets 22, which pass through the path of incident beam 36. Inasmuch as the pockets are in a fixed configuration on a given carrier, the computer can track rotational position of a carrier to within the arc occupied by a single pocket 22. Moreover, the computer can calculate intermediate rotational positions based upon the speed of rotation and the time elapsed since the last transition in reflectivity.

The sensor 38 and the interface between the sensor and computer 44 are arranged to generate and record separate sets of signals representing the X and Y positions of intercept point 42 at a high rate, desirably at least about Khz (5,000 sets of signals per second), more preferably at least about 10 Khz, and most preferably about 15 Khz or more.

In operation, with wafers 24 loaded onto carrier 12, the chamber is closed and heater 26 is actuated to bring the chamber, carrier and wafers to a desired processing temperature. The gas supply 28 and vacuum pump 30 are actuated in the normal manner to provide the required reactive gases and pressure within the chamber for treatment of the wafers. Typically, this process will involve deposition of a film on the surface of the wafer. During processing, motor 18 rotates carrier 12 about axis 16, whereas laser 32 generates the incident beam along axis 36. As the carrier rotates, the successive wafers and successive portions of carrier surface 20 between the wafers intercept the incident beam on axis 36. The reflected beam 41 passes upwardly back through window 11, and at least a portion of this beam continues through beam splitter 34 to sensor 38 and impinges on the sensor plane 40 at the intercept point 42, as discussed above. As successive portions of each wafer pass through the axis 36, the incident beam sweeps across successive points of impingement on the wafer surface. At the instant depicted in FIG. 1, the incident beam is impinging on a point "B" on the wafer surface. The disposition of the reflected beam 41, and hence the position of point 42 at this instant, relates directly to the local tilt angle of the surface of the wafer at impingement point B.

The beam 41 reflected from impingement point B is disposed at an angle γ (FIG. 1) with respect to an axis 37 extending between the impingement point B and the origin 47 of the x-y coordinate system. The normal vector V to the surface of the wafer bisects this angle γ. Stated another way, because the reflection at point B is specular reflection, the angle of incidence is equal to the angle of reflection. Thus, the angle α between the axis 37 and the normal vector V is one half the angle γ. These angles are greatly exaggerated in FIG. 1 for clarity of illustration. The normal vector V may be tilted in any direction relative to axis 37, and accordingly the angle γ will have a component $\gamma_r$ (not shown) in the radial direction and a component $\gamma_t$ (not shown) in the tangential direction, and the angle α likewise will have components $\alpha_r$ and $\alpha_t$ in the radial and tangential directions, components $\alpha_r$ and $\alpha_t$ being one-half of components $\gamma_r$ and $\gamma_t$ respectively.

The values of x and y for the beam reflected from any impingement point B are directly proportional to the tangents of angles $\gamma_r$ and $\gamma_t$ respectively. For the small values of these angles encountered in practice, the tangents can be taken as equal to the angles, so that x and y are proportional to $\gamma_x$ and $\gamma_y$. Thus, the components $\alpha_r$ and $\alpha_t$ of the normal vector tilt angle are proportional to x and y:

$$\alpha_t = C_{angle} x; \quad (1a)$$

$$\alpha_r = C_{angle} y \quad (1b)$$

where $C_{angle}$ is a calibration constant. Thus, the system determines the direction of the normal vector V at impingement point B by measuring the location of reflected beam 41 in the x and y dimension.

The system also determines the origin of each impingement point B in the frame of reference of the carrier. The radial distance $R_B$ from the center A of the carrier is equal to the known radial distance between axis of rotation 16 and the point where impingement axis 36 crosses the plane of the carrier surface. The circumferential location is specified as an angle φ between the radial line passing through the impingement point B and a radial line passing through a datum point, which in this case is the center C of the wafer. As mentioned above, computer 44 keeps track of the rotational position of the carrier as the carrier rotates. Thus, when values of x and y are captured for a particular impingement point B, the computer associates a value of φ with that impingement point and the vector direction data for that point. This may be done explicitly, by recording the value of φ along with each set of values x and y (or the calculated values $\alpha_r$ and $\alpha_t$). Alternatively, this may be done implicitly, by capturing x and y values at preselected values of φ to provide a sequence of sets of vector direction values x and y (or $\alpha_r$ and $\alpha_t$) such that the position of each set of vector direction values in the sequence denotes the values of φ associated with that set. Thus, the computer records the vector direction values as a function of φ.

As the carrier 12 rotates, additional wafers 24 pass through the incident beam 36, and the computer collects vector direction values as a function of φ for numerous impingement points on each wafer, in the same manner as discussed above. The computer maintains the values for each wafer separate from the values for other wafers. With continued rotation of the carrier, the same wafers pass back again through the incident beam 36. Normal vector direction values are collected again for each wafer on each pass through the incident beam, in each case as a function of the rotation angle φ between the impingement point and the center C of the wafer. The values collected for each wafer during numerous revolutions of the carrier are used in determining the curvature of the wafer as discussed below.

With good approximation, the surface of each wafer is a segment of a sphere. The calculation of wafer curvature is based on that assumption. Given that assumption, all of the normal vectors for a given wafer should intersect at a single center point. In an ideal system, location of the center point of the sphere, and hence the radius of the sphere and the curvature of the wafer, could be calculated simply by determining the intersection point of any two normal vectors. In a practical system, the task is complicated by factors such as vibration of the wafers and carrier, which may substantially alter the directions of individual normal vectors. The system suppresses the effects of these errors by calculating the best approximation to the position of the center point of the sphere from data specifying the directions and origins of numerous normal vectors.

Figure 2:
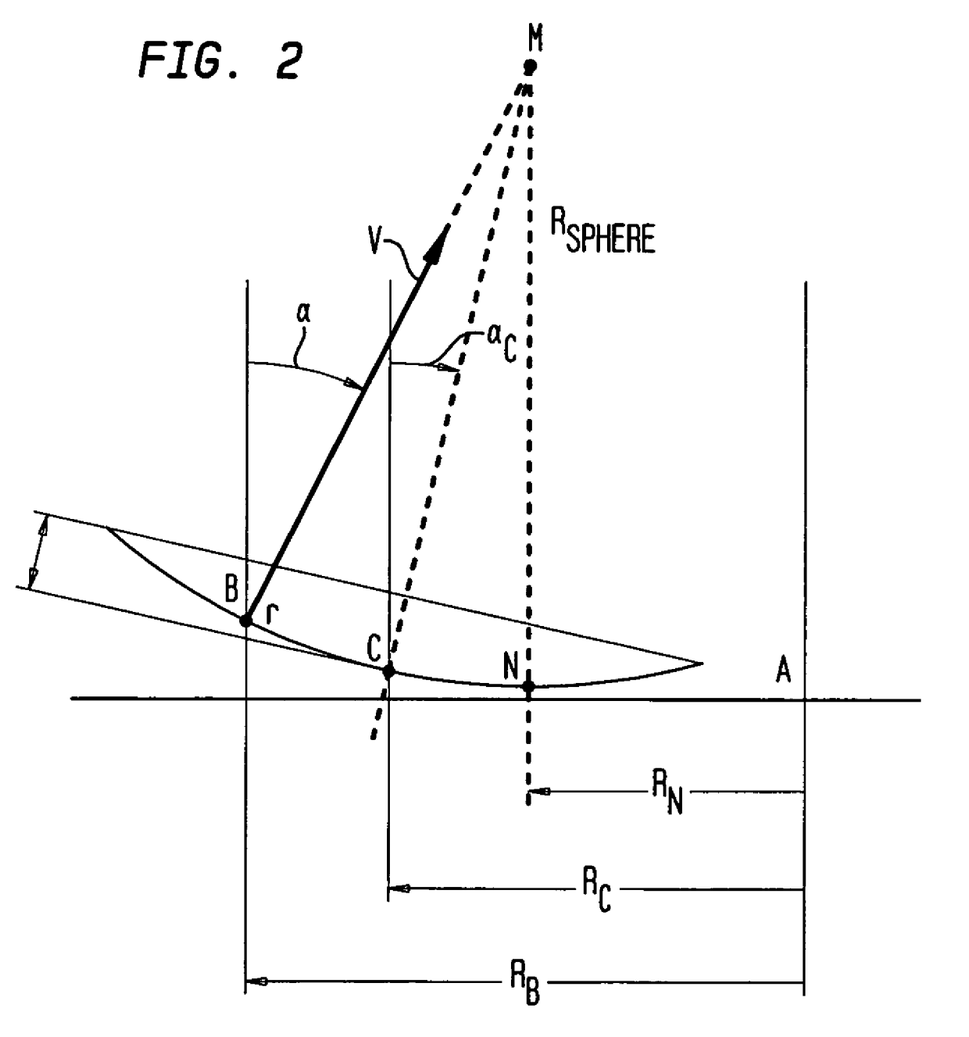
FIG. 2 is a diagrammatic, sectional view of a wafer during operation of the apparatus shown in FIG. 1.

As shown in FIG. 2, the sphere can be described by its radius $R_{sphere}$ and by the location of the center point M of the sphere. The location of the center point can be fully specified by specifying the position of point N, which is a projection of the center of the sphere (point M) to the wafer plane. Stated another way, point N is the point where surface of the sphere is normal to the axial or horizontal direction of the rotation axis 16. The location of point N is specified by its radial distance $R_N$ from the rotation axis 16 and by its angular position $\phi_N$ relative to the datum line passing through the wafer center C.

In the particular system discussed above with reference to FIG. 1, the directions and origins of the normal vectors are recorded as the angles $\alpha_t(\phi)$ and $\alpha_r(\phi)$ of normal vectors all passing through origins at the same radius $R_B$ but at different angular positions $\phi$. The relationship between the angles $\alpha_t(\phi)$ and $\alpha_r(\phi)$ and the parameters which specify the spherical surface are described by equations:

$$\alpha_t(\phi) = a \sin(\phi - \phi_N) \quad (2a)$$

$$\alpha_r(\phi) = a \cos(\phi - \phi_N) - b \quad (2b)$$

where $$a = R_N / R_{sphere} \quad (3)$$

$$b = R_B / R_{sphere} \quad (4)$$

Computer 44 performs the calculations discussed below to find the a best set of values of a, b and $\phi_N$ which represent the best estimate of the location of the center of the sphere. One mathematical algorithm for selected such a best set of values is given below, but the invention is not restricted to the use of this particular algorithm. Equations (2a,b) can be rewritten as:

$$\alpha_t(\phi_i) = a1 \sin(\phi_i) - a2 \cos(\phi_i) \quad (5a)$$

$$\alpha_r(\phi_i) = a1 \sin(\phi_i) + a2 \cos(\phi_i) - b \quad (5b)$$

where $$a1 = \cos(\phi_N), a2 = \sin(\phi_N), \text{ so } \phi_N = arctg(a2/a1) \quad (6)$$

Equations (5a,b) are linear and can be used for least squares fit to minimize over a1 a2 b the error function $\Phi$:

$$\Phi = \Sigma(\alpha_t(\phi_i) - \alpha_{t,i})^2 + \Sigma(\alpha_r(\phi_i) - \alpha_{r,i})^2 \quad (7)$$

where - - - $\alpha_{t,i}$ and $\alpha_{r,i}$ are set of data measured for one wafer, i=1, 2 . . . M, and M is the number of points in the data set for the wafer.

Equations for parameters which minimize $\Phi$ are:

$$d\Phi/da_1 = 0, d\Phi/da_2 = 0 \ d\Phi/db = 0 \quad (8)$$

After some algebraic calculations (8) give set of three linear algebraic equations to calculate a1 a2 b $$|a_{11} a_{12} a_{13}| |a1| |c_1|$$

$$a_{12} a_{22} a_{23} | |a2| = |c_2|$$

$$|a_{31} a_{32} a_{33}| |b| |c_3|$$

where $$a_{12} = a_{21} = 0;$$

$$a_{11} = a_{22} = a_{33} = 1$$

$$a_{13} = a_{31} = -\Sigma \cos(\phi_i)/M$$

$$a_{23} = a_{32} = -\Sigma \sin(\phi_i)/M$$

$$c_1 = \Sigma(\alpha_{t,i} \sin(\phi_i) + \alpha_{r,i} \cos(\phi_i))/M$$

$$c_2 = \Sigma(-\alpha_{t,i} \cos(\phi_i) + \alpha_{r,i} \sin(\phi_i))/M$$

$$c_3 = \Sigma \alpha_{r,i}/M$$

Once parameters a,b, and $\phi_N$ have been calculated for a particular wafer, the computer uses these calculated parameters to calculate the radius of curvature $R_{sphere}$ radius and the tilt of the wafer in terms of the circumferential and radial angles of the normal vector to the center of the wafer ($\alpha_{C,r}$ $\alpha_{C,t}$);

$$R_{sphere} = R_B / b \quad (5)$$

$$\alpha_{C,r} = a \cos \phi_N - b R_C / R_B \quad (6a)$$

$$\alpha_{C,t} = a \sin \phi_N \quad (6b)$$

Because $R_{sphere}$ is not a convenient parameter, for final presentation it is recalculated to wafer curvature K:

$$K = 1/R_{sphere} = b/R_B \quad (7)$$

K>0 for concave surface
K<0 for convex surface
Wafer deflection (d) (FIG. 2) can be easily calculated from curvature $$d = K \phi_{water}^2 / 8 \quad (8)$$

where $\phi_{water}$ is the wafer diameter.

The calculations mentioned above desirably are performed during the deposition process. The wafer curvature is directly related to strain in the layer being grown on the wafer, and is measured at the deposition temperature. As set forth in Hoffman et al., "In-Situ Strain Measurement During Epitaxy of InP Based Materials," 15th IRPM, Presented May 12, 2003; and in Hoffman et al., "In situ strain control during MOCVD growth of high-quality InP-based long wavelength distributed Bragg reflectors," J. Crystal Growth, 261 (2004) pp. 201-308, properties of grown layers and structures incorporating the grown layers at room temperature are related to the strain observed during growth. These articles describe improvement in Hall mobility of an InP layer and reduction in diffuse reflectivity of a distributed Bragg reflector grown from alternating layers of InGaAlAs and InP by selection of particular strain values in the grown layers. However, the same principles can be applied in growth of numerous different layers. In general, the strain in a growing layer of a compound semiconductor varies with the composition of the deposited layer. By making minor adjustments in the composition of the deposited layer, the strain can be held to a desired value. For example, III-V semiconductors are formed from a Group III component including one or more of In,Ga and Al and a Group V component including one or more of As,P and N. Slight variations in the composition of the Group III component (such as increasing or decreasing the proportion of In) or in the composition of the Group V component will change the lattice spacing of the deposited layer and thus will change the strain in the deposited layer. In a real-time feedback control scheme, computer 44 can control the composition of the deposited layer by adjusting the composition of the gases supplied by gas supply 28 to maintain a desired strain value. Because control is based on actual measured strain, the control system does not depend on an assumed exact relationship between gas composition and layer composition. In a variant of this approach, the system can be operated in a series of test operations to deposit layers at slightly different strain levels using slightly different gas composition settings, and a desired setting can be selected for subsequent production runs in the same system based on a measured relationship between gas composition and measured strain.

The apparatus can also provide information about the deformation and tilt of the carrier. Normally, the carrier surface does not provide specular refelection and hence does not provide a readily detectable reflected beam when the incident beam 36 falls directly on the carrier surface 20. As mentioned above, however, the system calculates the tilt of each wafer as the direction (radial and circumferential tilt angles) of the normal vector at the center of the wafer. As a first approximation it is assumed that the carrier surface is a tilted spherical segment. It is further assumed that all wafers are parallel to the carrier surface, so that the normal vectors at the centers of the wafers represent normal vectors at the surface of the carrier, at the centers of the various pockets 22. In this case the wafers tilts ($\alpha_{t,k}$ $\alpha_{r,k}$, where k is the pocket number) represent the carrier local tilt in the points of pocket centers. Given these assumptions, spherical radius of the carrier or its inverse $K_{carrier}$ can be found in much the same way as the radius of curvature of an individual wafer. $\alpha_{t,k}$ $\alpha_{r,k}$ are described by linear equations similar to (2)

$$\alpha_{t,k} = a_{carrier} \sin(\phi_k - \phi_{N,carrier}) \tag{9a}$$

$$\alpha_{r,k} = a_{carrier} \cos(\phi_k - \phi_{N,carrier}) - b_{carrier} \tag{9b}$$

These approximations allow calculating the carrier tilt, curvature, and deflection from the set of wafer tilt data.

$$\alpha_{carrier} = a_{carrier} \tag{10}$$

$$K_{carrier} = b_{carrier}/R_C \tag{11}$$

If the carrier has six or more wafers, then the tilt and curvature can be estimated without fitting $\alpha_{t,k}$ $\alpha_{r,k}$ data to the model equations (9).

$$\alpha_{carrier} = (\max(\alpha_{r,k}) - \min(\alpha_{r,k}))/2 \tag{12}$$

$$K_{carrier} \approx <\alpha_{r,k}>/R_C \tag{13}$$

Here max $(\alpha_{r,k})$ and min $(a_{r,k})$ are maximum and minimum values from the $\alpha_{r,k}$ set, and $<\alpha_{r,k}>$ is the average of $\alpha_{r,k}$. The average radial tilt $<\alpha_{r,k}>$ is calculated and displayed as the estimate of the tilt of the assumed spherical surface of the carrier relative to the axis of rotation 16. The properties of the carrier can be more clearly stated as deflection ($d_{carrier}$) and wobbling ($w_{carrier}$). These parameters can be calculated as follows:

$$d_{carrier} = K_{carrier} \phi_{carrier}^2/8 \approx <\alpha_{r,k}> \phi_{carrier}^2/8 \tag{14}$$

$$w_{carrier} = \alpha_{carrier} \phi_{carrier}/2 \approx (\max(\alpha_{r,k}) - \min(\alpha_{r,k})) \phi_{carrier}/4 \tag{15}$$

Numerous variations and combinations of the features discussed above can be utilized. For example, in the system described above with reference to FIG. 1, the wafers move along a circular path. However, the same approach can be used where the wafers move along a non-circular path as, for example, a rectilinear path, most preferably in a plane. In the embodiment of FIG. 1, the strain measurement is obtained during growth in an MOCVD process. However, the curvature measurement system can be used in conjunction with other growth processes such as molecular beam epitaxy, and in conjunction processing which does not involve growth as, for example, during annealing or etching of semiconductor wafers. Also, the curvature measurement system can be applied to objects other than semiconductor wafers.

As these and other variations and combinations of the features discussed above can be utilized without departing from the present invention as defined by the claims, the foregoing description of the preferred embodiments should be taken by way of illustration rather than by way of limitation of the invention as defined by the claims.

The invention claimed is:

1. A method of monitoring the curvature of a surface of a body comprising the steps of:
   (a) directing a beam of light along an impingement axis onto the surface so that a beam of light is reflected from the surface at a point of impingement;
   (b) detecting the position of the reflected beam in two dimensions;
   (c) determining the direction of a vector normal to the surface at the point of impingement from the detected position of the reflected beam;
   (d) moving the body relative to the impingement axis in a direction transverse to the impingement axis and repeating steps (a), (b), and (c) whereby, in each repetition the beam will be directed onto a new point of impingement; and
   (e) calculating the curvature of the surface from the determined directions of the normal vectors in a plurality of repetitions.

2. A method as claimed in claim 1 wherein said body is a semiconductor wafer.

3. A method as claimed in claim 2 wherein said wafer is mounted on a carrier and said step of moving the body includes rotating the carrier about an axis of revolution.

4. A method as claimed in claim 2 further comprising calculating a tilt angle of the wafer based on the detected positions of the reflected beam, said tilt angle representing the direction of a vector normal to the surface of the wafer at the center of the wafer.

5. A method as claimed in claim 3 wherein said wafer is mounted on the carrier remote from the axis of revolution.

6. A method as claimed in claim 1 wherein the calculation step includes determining a position of an intersection point of a plurality of the determined normal vectors.

7. A method as claimed in claim 6 wherein the step of determining a position of an intersection point includes approximating the position of the intersection point when the normal vectors do not intersect.

8. A method as claimed in claim 6 wherein the calculation step includes averaging the positions of a plurality of determined intersection points.

9. A method of monitoring the curvature of a semiconductor wafer surface comprising the steps of:
   (a) rotating a carrier about an axis of revolution, the carrier bearing the semiconductor wafer remote from the axis of revolution with a major surface of the wafer extending generally transverse to the axis of revolution;
   (b) directing an incident beam of light along an impingement axis so that the major surface sweeps across the impingement axis, whereby the incident beam impinges on the major surface at a series of impingement points and a beam is reflected from each impingement point;
   (c) detecting the position of each reflected beam in two dimensions; and
   (d) calculating the radius of curvature of the wafer from the detected positions of the reflected beams, said step of calculating the radius of curvature of the wafer being based on an assumption that the major surface of the wafer is a segment of a sphere.

10. A method as claimed in claim 9 wherein said impingement axis is fixed relative to said axis of revolution.

11. A method as claimed in claim 9 further comprising determining a tangential position of each impingement point, said step of calculating the radius of curvature of the wafer being based in part on said tangential positions and said positions of said reflected beams.

12. A method as claimed in claim 9 wherein said calculating step includes calculating a tilt angle of a vector normal to the surface at each impingement point based upon the position of the beam reflected from such impingement point.

13. A method as claimed in claim 12 wherein said step of calculating a tilt angle for each impingement point includes calculating a radial tilt angle component in a radial plane including said axis of rotation and the impingement point and calculating a tangential tilt angle component in a plane perpendicular to the radial plane and parallel to the axis of rotation.

14. A method as claimed in claim 9 wherein said step of calculating the radius of curvature includes calculating the radius of curvature based at least in part on the positions of the reflected beams from a plurality of impingement points.

15. A method as claimed in claim 14 wherein said step of rotating said carrier about said axis of rotation includes rotating said carrier through a plurality of revolutions and said step of calculating the radius of curvature includes calculating the radius of curvature based at least in part on the positions of beams reflected during a plurality of revolutions.

16. A method as claimed in claim 14 wherein said step of calculating the radius of curvature includes averaging information derived from the positions of the reflected beams from said plurality of impingement points.

17. A method as claimed in claim 9 further comprising calculating a tilt angle of said wafer based on the detected positions of the reflected beam, said tilt angle representing the direction of a vector normal to the surface of the wafer at the center of the wafer.

18. A method as claimed in claim 9 wherein said carrier bears more than one wafer, said directing and detecting steps are performed so as to detect the positions of beams reflected from impingement points on a plurality of wafers on the carrier, and said calculating step is performed so as to derive separate values of the curvatures of each of said plurality of wafers.

19. A method as claimed in claim 9 further comprising the step of treating said wafer, said directing and detecting steps being performed during said treating step.

20. A method as claimed in claim 19 wherein said treating step includes depositing a material on said wafer.

21. A method as claimed in claim 19 wherein said calculating step is performed during said treating step, the method further comprising controlling said treating step responsive to the calculated radius of curvature of the wafer.

22. A method as claimed in claim 9 wherein the calculation step includes determining the directions of vectors normal to the surface at the impingement points from the detected positions of the reflected beams, and calculating the radius of curvature based at least in part on the determined directions of the normal vectors.

23. A method as claimed in claim 22 wherein the calculation step includes determining a position of an intersection point of a plurality of the determined normal vectors.

24. A method as claimed in claim 23 wherein the step of determining a position of an intersection point includes approximating the position of the intersection point when the normal vectors do not intersect.

25. A method as claimed in claim 23 wherein the calculation step includes averaging the positions of a plurality of determined intersection points.

26. Apparatus comprising:
(a) a frame;
(b) a carrier rotatable relative to said frame about an axis of revolution, the carrier having a wafer-bearing region adapted to hold at least one semiconductor wafer remote from the axis of revolution with a major surface of the wafer extending generally transverse to the axis of revolution;
(c) a drive motor connected to said carrier for rotating said carrier about said axis of revolution;
(d) a light source mounted to said frame so that an incident beam of light from said light source will pass along an impingement axis extending through the wafer-bearing region of said carrier, whereby the incident beam will impinge on the major surface of a wafer carried by said carrier at a series of impingement points and beams will be reflected from such impingement points;
(e) a sensor mounted to said frame so that said sensor will intercept said reflected beams, said sensor being operative to provide signals representing the position of said reflected beams in two dimensions transverse to said impingement axis; and
(f) a computer linked to said sensor, said computer adapted to calculate the radius of curvature of the wafer from signals corresponding to the position of reflected beams from a plurality of impingement points, the calculation being based on an assumption that the major surface of the wafer is a segment of a sphere.

27. Apparatus as claimed in claim 26 wherein said frame includes a chamber, said carrier being disposed within said chamber, the apparatus further comprising a treatment gas supply unit connected to said chamber.

28. Apparatus as claimed in claim 27 further comprising a heater mounted in said chamber for maintaining said carrier at an elevated temperature.

29. Apparatus as claimed in claim 26 wherein said sensor is a two-dimensional position sensitive detector.

30. Apparatus comprising:
(a) a frame;
(b) a carrier rotatable relative to said frame about an axis of revolution, the carrier having a wafer-bearing region adapted to hold at least one semiconductor wafer with a major surface of the wafer extending generally transverse to the axis of revolution;
(c) a drive motor connected to said carrier for rotating said carrier about said axis of revolution;
(d) a light source mounted to said frame so that an incident beam of light from said light source will pass along an impingement axis extending through the wafer-bearing region of said carrier, whereby the incident beam will impinge on the major surface of a wafer carried by said carrier at a series of impingement points and beams will be reflected from such impingement points;
(e) a sensor mounted to said frame so that said sensor will intercept said reflected beams, said sensor being operative to provide signals representing the position of said reflected beams in two dimensions transverse to said impingement axis; and
(f) a computer linked to said sensor, said computer adapted to determine the direction of a vector normal to the major surface of the wafer at each impingement point, said computer adapted to calculate the curvature of the wafer from the determined directions of the normal vectors.

31. Apparatus as claimed in claim 30 wherein said frame includes a chamber, said carrier being disposed within said chamber, the apparatus further comprising a treatment gas supply unit connected to said chamber.

32. Apparatus as claimed in claim 31 further comprising a heater mounted in said chamber for maintaining said carrier at an elevated temperature.

33. Apparatus as claimed in claim 30 wherein said sensor is a two-dimensional position sensitive detector.

* * * * *

UNITED STATES PATENT AND TRADEMARK OFFICE
CERTIFICATE OF CORRECTION

| | |
|---|---|
| PATENT NO. | : 7,570,368 B2 |
| APPLICATION NO. | : 11/127834 |
| DATED | : August 4, 2009 |
| INVENTOR(S) | : Mikhail Belousov et al. |

It is certified that error appears in the above-identified patent and that said Letters Patent is hereby corrected as shown below:

Column 2, line 55, after "through" insert --the--
Column 5, line 16, before "Khz" insert --5--
Column 6, line 7, "td" should read --to--
Column 7, line 18, "find the a" should read --find a--
Column 7, line 20, "selected" should read --selecting--
Column 7, line 44, "$_{12}$" should read --$_{21}$--

Signed and Sealed this

Thirty-first Day of August, 2010

David J. Kappos
*Director of the United States Patent and Trademark Office*